(12) United States Patent
Korcz et al.

(10) Patent No.: US 8,729,388 B2
(45) Date of Patent: May 20, 2014

(54) MOUNTING MEMBER FOR AN ELECTRICAL BOX ASSEMBLY

(75) Inventors: Krzysztof W. Korcz, Granger, IN (US); Mahran H. Ayrton, South Bend, IN (US); Richard J. Wagner, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 89 days.

(21) Appl. No.: 13/445,625

(22) Filed: Apr. 12, 2012

(65) Prior Publication Data
US 2013/0105216 A1 May 2, 2013

Related U.S. Application Data

(63) Continuation-in-part of application No. 13/286,657, filed on Nov. 1, 2011.

(51) Int. Cl.
*H02G 3/08* (2006.01)

(52) U.S. Cl.
USPC ............... 174/50; 174/53; 248/906; 439/535

(58) Field of Classification Search
USPC ............. 174/53, 50; 220/3.2, 4.02; 411/548; 439/535; 248/906; 361/600
See application file for complete search history.

(56) References Cited

U.S. PATENT DOCUMENTS

| | | | |
|---|---|---|---|
| 3,375,749 A | 4/1968 | Coldren et al. | |
| 4,281,773 A * | 8/1981 | Mengeu | 220/3.2 |
| 4,925,351 A | 5/1990 | Fisher | |
| 4,936,396 A | 6/1990 | Lockwood | |
| 5,057,649 A * | 10/1991 | Ring | 174/53 |
| 6,174,118 B1 | 1/2001 | Rebers et al. | |
| 7,096,638 B2 | 8/2006 | Osterland et al. | |
| 7,168,138 B2 | 1/2007 | Lubera et al. | |
| D576,029 S | 9/2008 | Kato et al. | |
| 7,468,486 B2 | 12/2008 | Yan | |
| 7,496,993 B2 | 3/2009 | Kosidlo et al. | |
| 7,568,870 B2 | 8/2009 | Paquet | |
| 2008/0154281 A1 | 6/2008 | Schaffran et al. | |
| 2009/0087279 A1 | 4/2009 | McGinn et al. | |

* cited by examiner

*Primary Examiner* — Dhirubhai R Patel
(74) *Attorney, Agent, or Firm* — Garrett V. Davis; Mark S. Bicks; Alfred N. Goodman (57) ABSTRACT

An electrical assembly includes a wiring device and an insert clip or attachment member that can be preassembled to provide quick connection to an electrical box, mud ring or other support structure having an aperture with a dimension to receive the clip member. The clip member couples to the mounting screws of the wiring device and is snapped into an aperture or recess in a mud ring. The clip has outwardly projecting tabs engaging the mud ring and inwardly extending tabs engaging the mounting screws. The tabs allow the mounting screws to be pressed into the clip in a sliding manner and allow the clip to snap into the aperture in the mud ring. In another embodiment, the attachment member has a substantially C-shape having an open side that can slide onto a pair of projections on an inner edge of a mud ring for supporting the electrical device.

29 Claims, 12 Drawing Sheets

FIG. 31

MOUNTING MEMBER FOR AN ELECTRICAL BOX ASSEMBLY

CROSS-REFERENCE TO RELATED APPLICATION

This application is a continuation-in-part of Ser. No. 13/286,657, filed Nov. 1, 2011, which is hereby incorporated by reference in its entirety.

FIELD OF THE INVENTION

The present invention is directed to a mounting member for coupling the electrical device to an electrical box. The invention is further directed to a mounting member providing a snap connection for an electrical device to a mud ring, plaster frame or other support surface on an electrical box.

BACKGROUND OF THE INVENTION

Electrical boxes often require the use of a mud ring or extension to position the electrical wiring device at the desired location with respect to the wall surface. The mud ring can have threaded screw holes to receive the mounting screws of the wiring device. Alternatively, the mud ring can have apertures that allow the screws to pass through to enable the screws to thread into the screw holes in the electrical box.

Various clips have been proposed that can be inserted into an aperture in a structure and have a passage for receiving a screw or other fastener. Many of these clips are made from spring steel.

For example, U.S. Patent Publication No. 2009/0087279 to McGinn et al. discloses a spring clip for connecting the screws of an electrical device to the cover plate of an electrical box. The spring clip can be connected directly to the inner face of the cover plate so the screw can slide through the opening in the spring clip.

U.S. Pat. No. 5,057,649 to Ring discloses an electrical wiring box with a tab and flange for mounting the electrical device. A spring clip is mounted to the outer surface of the flange for receiving the screws on the electrical device. The spring clip has inwardly extending legs to engage the threads on the screws.

U.S. Pat. No. 4,936,396 to Lockwood discloses an electrical box having inwardly extending columns with an aperture for receiving the screws of an electrical device. A spring clip is snapped into the opening. The spring clip includes legs with outwardly extending tabs to retain the spring clip in the aperture and inwardly extending tabs to engage the threads of the screw.

U.S. Pat. No. 7,568,870 to Paquet discloses a push nut that is received in the opening of a plate. The push nut includes an axial passage with inwardly extending legs for receiving the threads of a screw. Outwardly extending legs project outwardly to engage the inner surface of the plate and to couple the push nut to the plate.

U.S. Pat. No. 7,468,486 to Yan relates to an adjustable mud ring system. The device includes a frame attached to the electrical box and a movable extending member. The extending member has tabs with threaded holes so that an electrical receptacle can be attached directly to the tabs.

While these devices are generally suitable for the intended purpose, there is a continuing need in the industry for improved devices for attaching an electrical wiring device to an electrical box.

SUMMARY OF THE INVENTION

The present invention is directed to an electrical assembly that can be assembled quickly and easily on the work site with minimal effort. The invention is particularly directed to an electrical wiring device having mounting screws and an attachment member so that the wiring device can be coupled quickly to an electrical box, mud ring, plaster frame or mounting surface.

Accordingly, one feature of the invention is to provide an electrical wiring device that can be snapped onto an opening in a mud ring or other support surface either before or after the mud ring is coupled to the electrical box. A spring clip or mounting member is included to couple the wiring device to the mud ring. The mounting screws on the wiring device can be aligned with the screw holes in the electrical box for easy threading of the screws into the screw holes to couple the wiring device securely to the electrical box.

Another feature of the invention is to provide a mud ring or other support member having a clip member coupled thereto to enable an electrical wiring device to be quickly attached to the mud ring. The clip member and mud ring can be produced as a preassembled unit. The wiring device and the mud ring can form a preassembled unit that can then be coupled to the electrical box.

A further aspect of the invention is to provide a clip and mounting member formed as a one piece unit for coupling a wiring device to a mud ring.

Another feature of the invention is to provide a clip and attachment member for coupling a wiring device to a mounting surface, mud ring or electrical box that can be produced inexpensively and is easy to install. The clip and attachment members are made from a flexible and resilient metal to provide a snap coupling to the mounting screws of the electrical device and to the mud ring or other support member.

The clip and mounting member of the invention is preferably a one piece integrally formed member made from a spring steel. In one embodiment, the spring clip is made from pre-tempered stainless steel. The clip member has a body with an axial passage for the mounting screw and a coupling member for coupling the clip member to a mounting surface, mud ring or electrical box.

In one embodiment, the body of the clip member has a generally U-shape with a top end and bottom end formed with a first portion and a second portion connected together by a curved bottom portion. The bottom portion has an open area to define an axial passage to allow the mounting screw of an electrical wiring device to pass through. Tabs are provided to engage the mounting screw and to engage the mounting surface. The tabs are sufficiently resilient to provide a snap connection.

Another feature of the invention is to provide a clip member having a U-shaped body portion with at least one inwardly extending tab for coupling with a mounting screw of an electrical wiring device. The body portion also has an outwardly extending tab for engaging an opening in a mud ring.

In another embodiment, an attachment member has a substantially C-shape with a hole for receiving the screw of the electrical device. A leg of the attachment member attaches to the mud ring.

These and other aspects of the invention are basically attained by providing an electrical wiring device having at least one mounting screw and a one piece attachment member for coupling the wiring device to an electrical box. The attachment member has a top face with an axial passage receiving the at least one mounting screw, and a pair of legs with an inwardly extending tab adapted for coupling with an opening in an electrical box or mud ring. The electrical box or mud ring has an inner edge with an open slot for receiving the legs of the attachment member.

The features are further attained by providing an electrical assembly comprising an electrical box having an open end and at least one coupling tab having a screw hole and a mounting member adapted for coupling to the open end of the electrical box. The mounting member has a mounting surface with an aperture aligned with the screw hole. An attachment member is adapted for being received in the aperture for coupling the electrical device to the electrical box and/or mud ring. The attachment member has an axial passage with inwardly extending tabs for receiving the mounting screw.

The various features of the invention are further attained by providing a one piece integrally formed insert attachment member comprising a top wall with a first leg portion and a second leg portion extending from the top wall. An inwardly extending tab extends into the axial passage for gripping a screw and for coupling to a pair of projections on the inner edge of the electrical box or mud ring. An axial passage extends through an opening in the top wall and between the leg portions.

The features of the invention are still further attained by providing a method of assembling an electrical assembly, the method comprising the steps of providing an electrical wiring device having a mounting screw, coupling an attachment member to the mounting screw, and coupling the attachment member in an aperture in a collar of a mud ring for an electrical box.

The features of the invention are also provided by providing a mud ring and an attachment member adapted for coupling to the mud ring. The attachment member has a top portion with a screw hole forming an axial passage, and a pair of legs extending from the top portion, where each leg has an inwardly extending tab. The attachment member has a transverse passage between the legs for mating with a pair of spaced-apart projections extending inwardly from the inner edge toward the opening in the mud ring.

The various objects and features of the invention will become apparent from the following detailed description of the invention which, in conjunction with the annexed drawings, disclose various embodiments of the invention.

BRIEF DESCRIPTION OF THE DRAWINGS

The following is a brief description of the drawings, in which.

DETAILED DESCRIPTION OF THE INVENTION

The present invention is directed to an electrical assembly for mounting an electrical wiring device such as a duplex receptacle or switch to an electrical box, mud ring, plaster frame or other support member. The invention is particularly directed to a mounting device for attaching an electrical wiring device to a mounting surface, an electrical box or a mud ring attached to the electrical box. The mounting device in the embodiments shown and described is a spring clip member or attachment member. The assembly according to the invention enables quick and efficient mounting of the electrical wiring device.

Figure 1:
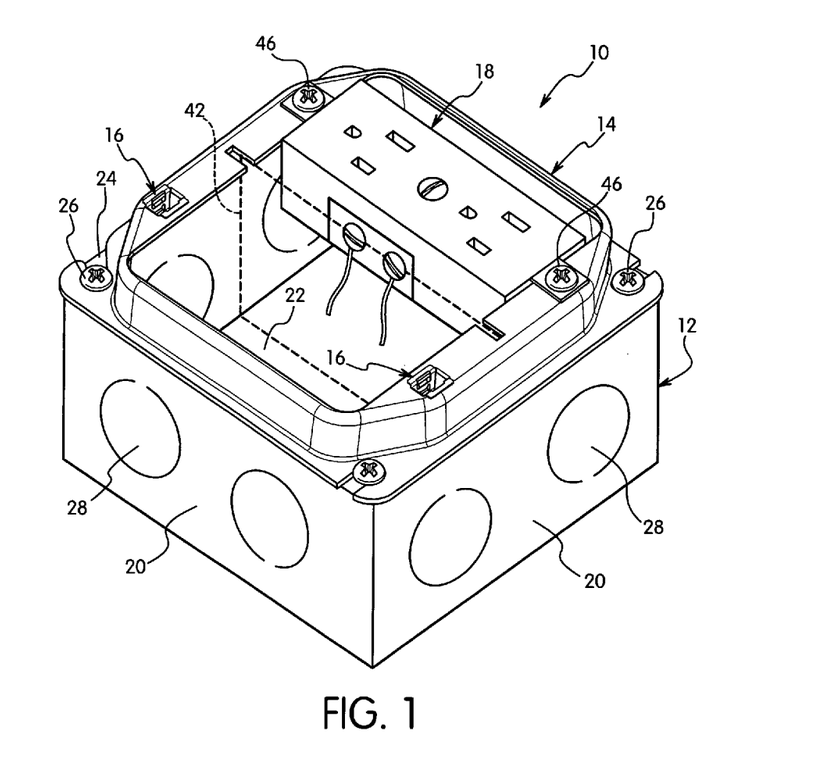
FIG. 1 is a perspective view of the electrical assembly in a first embodiment of the invention showing the electrical box, mud ring, clip member and electrical wiring device.
Figure 2:
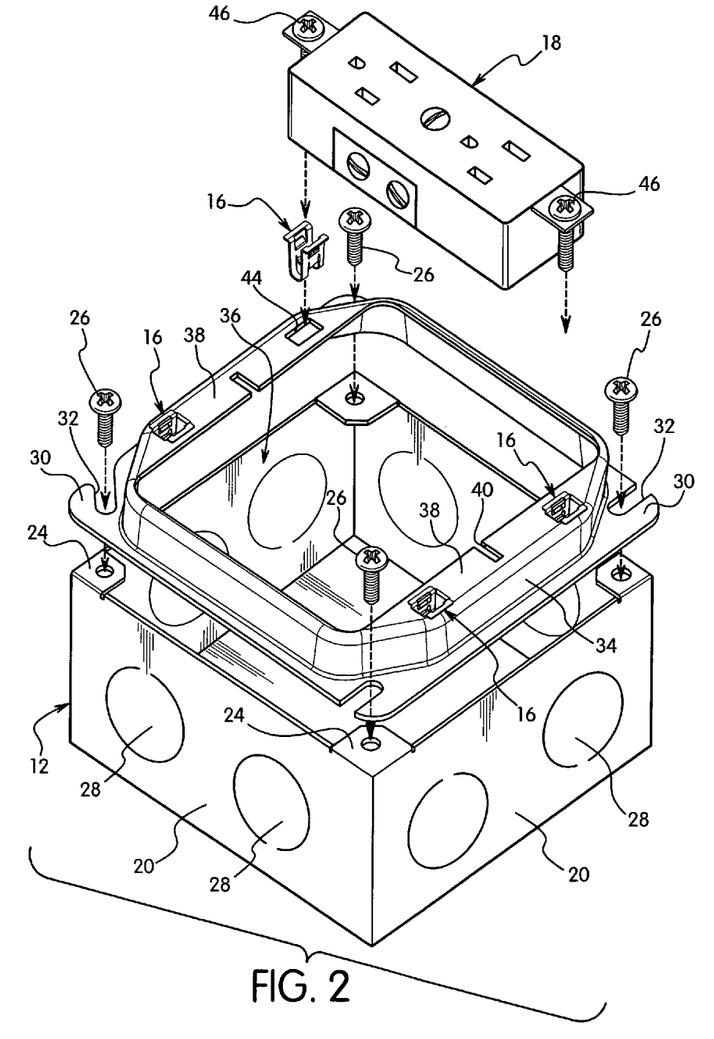
FIG. 2 is an exploded view of the electrical assembly of FIG. 1.

Referring to the drawings, the electrical assembly 10 in a first embodiment of the invention includes an electrical box 12, an extension plate or plaster frame, commonly referred to as a mud ring 14, a mounting clip member 16 forming an insert and an electrical wiring device 18. The mud ring 14 defines a mounting member having a support surface for receiving and supporting the electrical wiring device 18 and for coupling to the electrical box. The mud ring 14 forms an extension or collar to space the wiring device from the top edge of the electrical box. In the embodiment shown, the wiring device 18 is a duplex receptacle. Alternatively, the wiring device can be a switch, a ground fault circuit interrupter, or other electrical component.

The electrical box 12 in the embodiment shown has a square configuration with an open top end, side walls 20 and a bottom wall 22. The top edge of the side walls include a mounting tab 24 with a threaded hole for receiving a coupling screw 26. The side walls 20 can include one or more knockouts 28 or pry-outs to feed electrical wiring to the electrical box as known in the art. The electrical box 20 in the embodiment shown is a two gang box having a square configuration. The invention is suitable for use with a single gang or multi gang box. The electrical box can have a round shape, rectangular shape or other shape as known in the art. The electrical box as shown is a conventional electrical box as known in the art.

The mud ring 14 has a shape and dimension corresponding to the electrical box 12. In the embodiment shown, the mud ring 14 is a two gang unit. Alternatively, the mud ring can be a single gang or multi gang unit corresponding to the size of the electrical box. In the embodiment shown, the mud ring is used to exemplify the features of the invention for mounting a wiring device. The assembly of the invention is suitable for use with other mounting surfaces or electrical box extensions and collars that are adapted for mounting and supporting an electrical wiring device.

The mud ring in the embodiment shown includes a bottom plate 30 having slots 32 in each of the respective corners for receiving the screw 26 to couple the mud ring to the electrical box. A side wall 34 extends perpendicular from the bottom plate 30 a distance corresponding to the thickness of the wall surface. The electrical box 12 is generally mounted to a wall stud or other support surface having a wall substrate attached to the wall stud. The mud ring 14 extends through an opening cut in the wall surface so that the top end of the side wall is substantially flush with the outer surface of the wall surface. The side wall defines a collar that extends from the electrical box to position the electrical wiring device at a desired position with respect to the wall.

Figure 3:
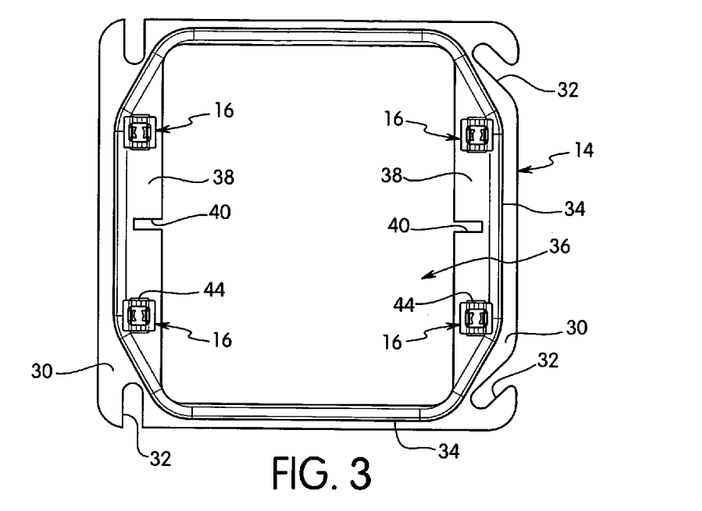
FIG. 3 is a top view of the mud ring and clip member of FIG. 1.

The side wall 34 of the mud ring 14 is continuous and forms a central opening 36 for receiving the wiring device 18. The side wall 34 includes an inwardly extending mounting flange 38 at opposite ends for supporting the wiring device 18. A notch 40 is formed in the mounting flanges 38 to receive a divider plate 42. The divider plate 42 forms two separate compartments within the electrical box for isolating the wiring and the wiring devices from each other. The mounting flanges 38 also include mounting holes 44 for receiving the mounting clip 16. The holes 44 are aligned on the opposite mounting flanges corresponding to the mounting screws 46 of the wiring device. The holes 44 have a shape and dimension corresponding to the outer dimension of the mounting clip member 16.

The mounting clip member 16 is adapted to be received within the mounting holes 44 in the mounting flange 38 of the mud ring for coupling the wiring device to the mud ring 14. In one embodiment shown in FIGS. 5-9, the mounting clip 16 has a main body portion 46 having a substantially U-shape. The body 48 has a bottom end 50 and a top end 52. The bottom end 50 has an open portion 54 forming an axial passage 56 that extends through the longitudinal dimension of the clip 16. The clip member 16 is preferably a one piece integrally formed member made of a spring steel such as pre-tempered stainless steel. A blank of the spring steel is stamped and bent to the desired shape. The material is preferably sufficiently flexible to snap into the mounting holes 44 and to allow the mounting screws to slide into the clip member.

Figure 5:
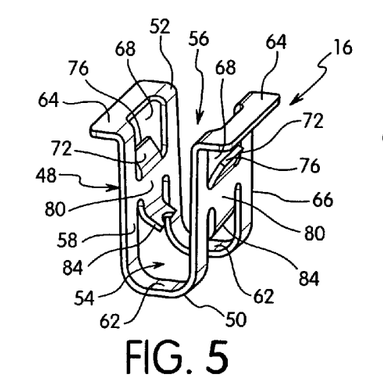
FIG. 5 is a top perspective view of the clip member in a first embodiment of the invention.
Figure 6:
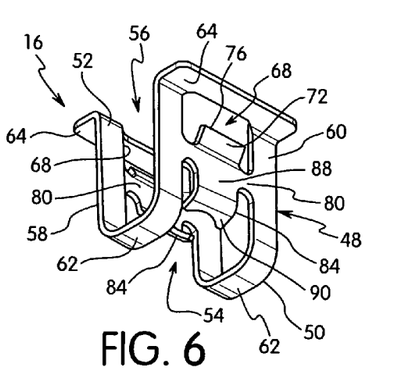
FIG. 6 is a bottom perspective view of the clip member of FIG. 1.

The body 48 has a first portion 58 forming a first leg and a second portion 60 forming a second leg. The first portion 58 and the second portion 60 are substantially parallel to each other and are connected together at a bottom end by a connecting member 62 to form the U-shape. The connecting member 62 allows the legs to bend inwardly when inserted into the opening 44 in the mud ring. The top end of each of the first portion and second portion have an outwardly extending flange 64. The flanges 64 have a dimension and shape supporting the clip member 16 on the mounting flange of the mud ring.

The first portion 58 and the second portion 60 each have a cut out 68 at the top end, and an outwardly extending tab 72. As shown in FIG. 5, the outwardly extending tabs 72 project outwardly at an incline angle with respect to the plane of the first portion 58 and second portion 60 and extend toward the respective top flange 64 and 66. The outwardly extending tabs 72 have a top edge 76 that is spaced from the bottom face of the respective top flange 64 and 66 to define a gap for coupling with the opening in the mounting flange.

Figure 7:
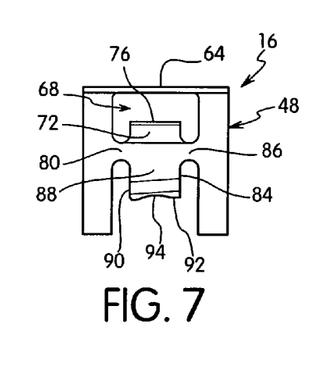
FIG. 7 is a side view of the clip member of FIG. 5.
Figures 8, 10:
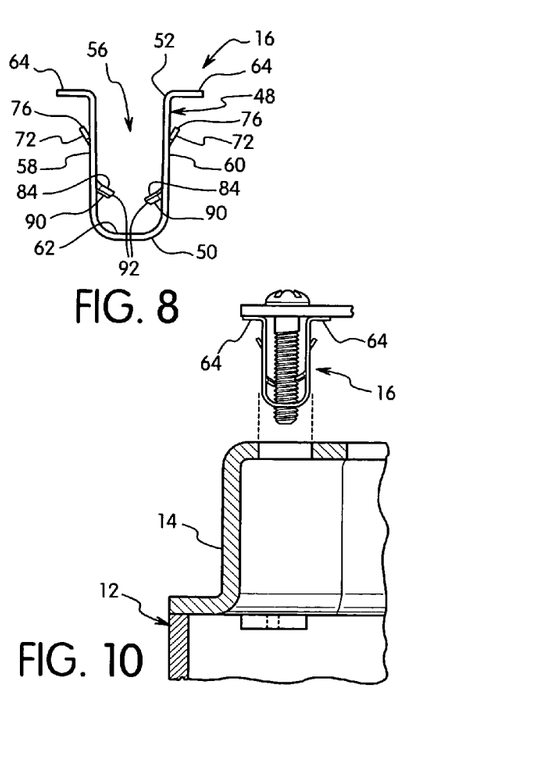
FIG. 8 is an end view of the clip member of FIG. 5.
FIG. 10 is a partial cross-sectional view showing the spring clip coupled to the wiring device before coupling to the mud ring.
Figure 9:
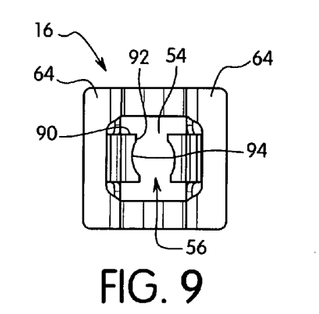
FIG. 9 is a top view of the clip member of FIG. 5.

The open bottom portion 54 and the cut outs 68 in the first and second portions define a cross member 80 as shown in FIG. 7. A downwardly extending tab 84 extends from each of the respective cross member 80. The downwardly extending tabs 84 have a first leg 88 extending substantially parallel to the respective first and second portions, and an inwardly extending second leg 90. The second leg 90 projects inwardly and downwardly towards the bottom end of the main body 48. The distal end 92 of the second leg has a concaved recessed portion 94. As shown in FIG. 9, the second legs 90 extend inwardly into the axial passage 56 so that the concave recessed portions 94 oppose each other. The spacing between the concave recesses 94 corresponds to the diameter of the mounting screws 46 for gripping the screw 46.

Figures 4, 4A:
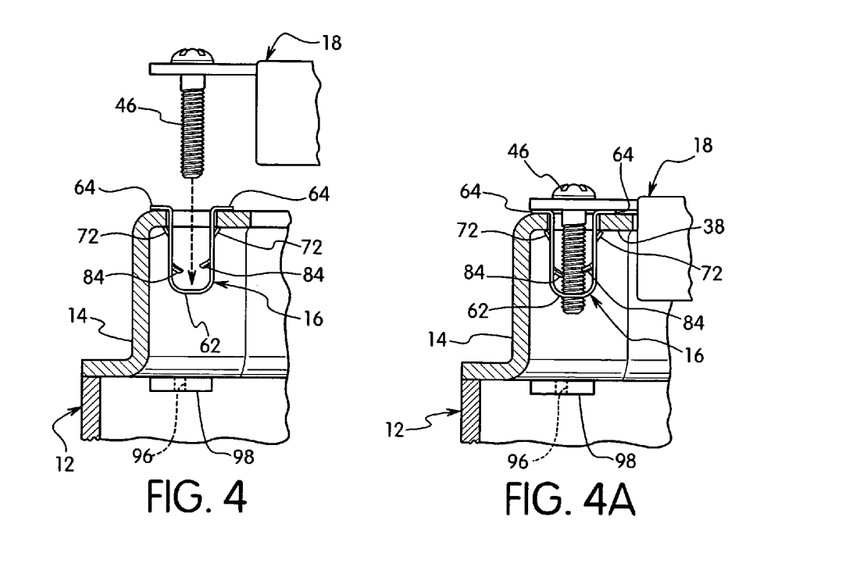
FIG. 4 is an exploded partial cross-sectional view of the electrical assembly of FIG. 1 showing the spring clip coupled to the mud ring.
FIG. 4A is a partial cross-sectional view of the electrical assembly showing the mud ring, clip member and mounting screw of the electrical device.

In use, the mounting screws 46 pass through the aperture in the wiring device 18 in a standard mounting fashion. The screws 46 are typically attached to the wiring device by the use of a retainer member. The mounting clip member 46 can be attached to the opening 44 in the mud ring as shown in FIGS. 2-4. The mounting screw 46 is pushed through the axial passage 56 and engages the inwardly extending tabs 84 as shown in FIG. 4A. The mounting clip is preferably made of a spring steel so that the tabs 84 are sufficiently resilient to allow the threads of the mounting screw 46 to slide or ratchet over the inwardly extending tabs 84 to the position shown in FIG. 4. The recessed portion 94 of the tabs 84 engage the screw. The downward angle of the second leg 90 allows the screw to slide between the legs in a downward direction and resists the screw from pulling out in an upward direction. The mounting screw can be separated from the clip by rotating the screw in a counter-clockwise direction. The screw can be rotated in a clockwise direction to thread the screw through the axial passage to seat the wiring device 18 against the top end of the clip member 16 and the mounting surface of the mud ring.

In a preferred embodiment, the mounting clip member 16 first is inserted into the respective hole 44 in the mud ring 14 to attach to the mud ring. As shown in FIG. 4, the outwardly extending tabs 72 are positioned to engage the inner surface of the mounting flange 38 to capture the mounting flange between the top edges of the tabs 72 and the top flange 64. In one embodiment, the mounting screws 46 can have a length to extend to the electrical box and screw into a threaded hole 96 in a mounting tab 98 extending inwardly from the side walls 20 of the electrical box 12.

The mounting clip members 16 are preferably snapped into the holes 44 in the mud ring as shown in FIGS. 3 and 4. The wiring device 16 and the respective screws are then be pushed or threaded through the axial passage of the mounting clip to couple the wiring device to the mud ring. The tabs 84 are sufficiently resilient or flexible to enable the installer to push the screws through the clip members 16 to couple the wiring device to the mud ring.

Figures 11, 12:
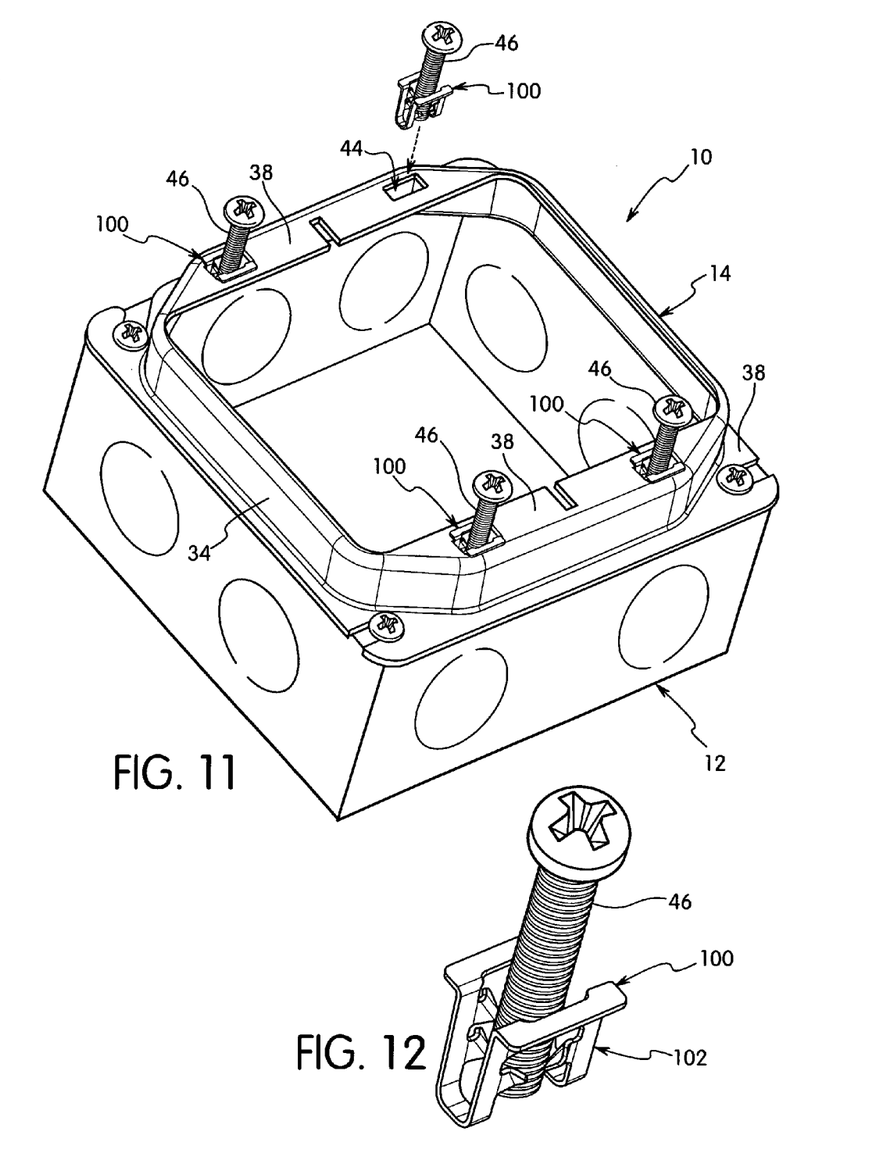
FIG. 11 is a perspective view of the mud ring and spring clip member in a second embodiment of the invention.
FIG. 12 is an enlarged perspective view of the clip member and mounting screw of FIG. 10.
Figure 13:
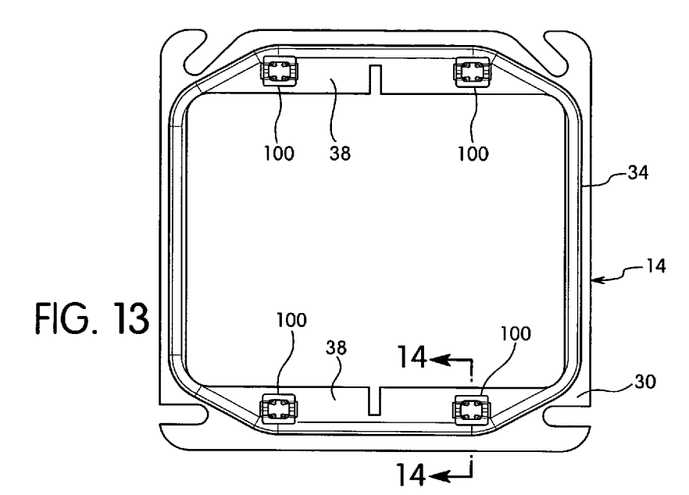
FIG. 13 is a top view of the mud ring clip member of FIG. 10.

In one embodiment, the mud ring 14 or other member for supporting the wiring device 18 is pre-assembled with the clip member 16. The clip member 16 is snapped into the opening 44 in the mud ring 14 and the mud ring is coupled to the electrical box 12. The electrical box 12 and the attached mud ring 14 are mounted to the wall stud and electrical wiring is supplied to the box in a standard manner. The electrician is then able to make the electrical connection with the wiring device and quickly couple the wiring device to the mounting surface of the mud ring by pressing and sliding the mounting screws through the clip member on the mud ring. The mounting screws, if necessary, can be turned to tighten the screws on the clip member and draw the wiring device snug on the mud ring. The tabs 84 of the clip member are angled inwardly and downwardly with respect to the clip member and the electrical box. The edges of the tabs 84 are similarly angled to grip the threads of the mounting screw to couple the wiring device securely to the mud ring and electrical box. In an alternative embodiment, the clip member is pre-assembled with the wiring device which is then snapped into the hole 44 of the mud ring to couple the wiring device to the mud ring as shown in FIG. 11.

Referring to FIGS. 11-19, a second embodiment of the invention is shown. In this embodiment, the electrical box and mud ring are substantially the same as in the first embodiment, and thus, are identified by the same reference numbers. For simplicity, the electrical wiring device is not shown in these Figures, although it will be understood that the wiring device is attached to the mud ring and the electrical box in a manner similar to the previous embodiment.

In this embodiment, the assembly includes a clip member 100 that receives the mounting screw 46 and snaps into the holes 44 in the mud ring 14. In FIG. 11, the mounting screws 46 are shown without the wiring device.

Figure 15:
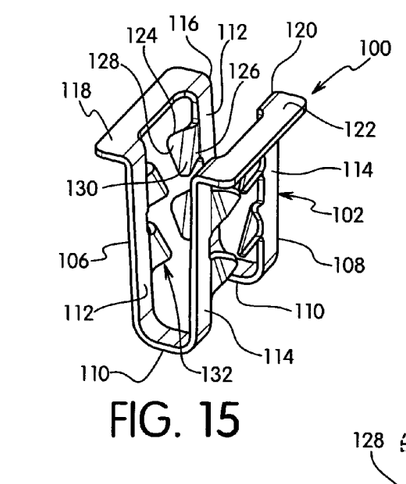
FIG. 15 is a top perspective view of the clip member of FIG. 10.
Figure 16:
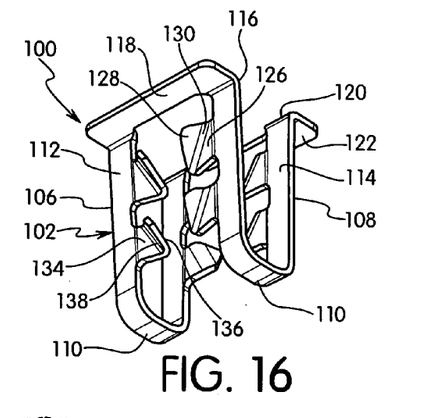
FIG. 16 is a bottom perspective view of the clip member of FIG. 11.

The clip member 100 as shown in FIGS. 15-19 is formed as a one piece unitary member. The spring clip is typically formed of a spring steel material that is stamped and formed to the desired shape. As shown in FIG. 15, clip member 100 has a substantially U-shaped body 102. The body 102 has an open bottom end forming an axial passage 104. The body 102 has a first portion 106 and a second portion 108 coupled together at a bottom end by a connecting portion 110. The first portion 106 and the second portion 108 are able to flex toward each other by bending about the connecting portion 110. The first portion 106 is formed by two parallel legs 112. The second portion 108 is formed by parallel legs 114. The upper end 116 of the first portion 106 includes an outwardly extending flange 118 and the upper end 120 of the second portion 108 includes a flange 122.

Figure 17:
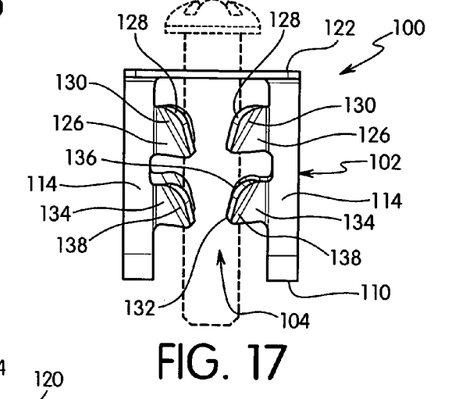
FIG. 17 is a side view of the clip member of FIG. 11.
Figure 18:
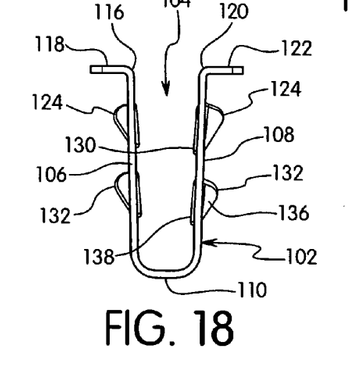
FIG. 18 is an end view of the clip member of FIG. 11.
Figure 19:
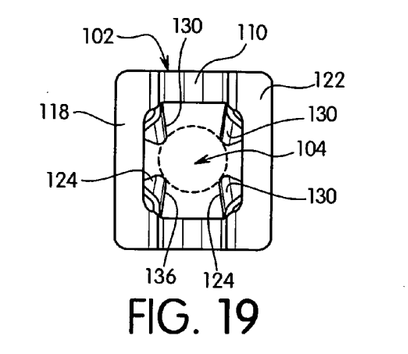
FIG. 19 is a top view of the clip member of FIG. 11.

Each of the legs have a first tab 124 at the upper end of the body and spaced from the flanges 118 and 122. The first tabs 124 includes a first leg portion 126 that extends inwardly toward the axial passage 104 at a slight angle with respect to the plane of the leg. A second leg portion 128 extends outwardly from the distal end of the first leg portion 126 away from the axial passage. The second leg portion 128 is bent along a diagonal fold line 130. As shown in FIG. 17, the diagonal fold line 130 extends substantially from the base of the first leg portion at a top edge to the distal end of the first leg portion and a bottom edge. The second leg portion 128 is curled outwardly as shown in FIG. 19 so that the diagonal fold line 130 defines the inner portion of the first tabs 124. The first leg portion 126 is bent slightly so the diagonal fold line 130 extends at an inclined angle with respect to the axis of the clip member.

Figure 14:
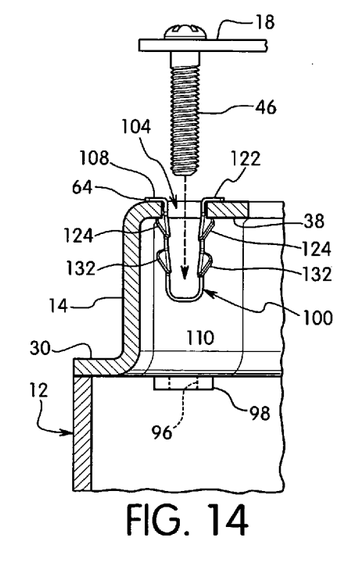
FIG. 14 is an exploded partial cross-sectional view of the electrical box, mud ring and the clip member taken along line 14-14 of FIG. 13.

A second tab 132 is formed on each of the legs 112 and 114 and spaced below the first tabs towards the bottom end of the body. The second tabs 132 are bent to have a form substantially the same as the first tabs 124. The second tabs 132 have a first leg portion 134 extending inwardly towards the axial passage and a second leg portion 136 bent outwardly with respect to the first leg portion along a diagonal fold line 138. As shown in FIG. 14, the first leg portion 126 and 134 are twisted slightly out of the plane of the legs 112 and 114 of the body 102 so that the bottom edge 140 of the first fold line 130 and the bottom edge 142 of the second diagonal fold line 138 project inwardly towards the axial passage 104.

Figure 14A:
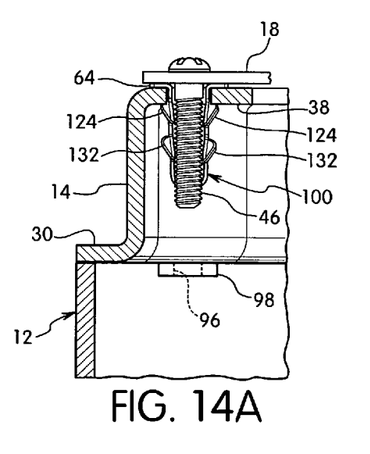
FIG. 14A is a partial cross-sectional view of the mud ring and clip of FIG. 13 showing the mounting screw of the electrical device.

The clip member 100 is coupled to the mud ring in a manner similar to the previous embodiment. The tabs 124 are sufficiently resilient to snap into the opening 44 of the mud ring and couple to the mud ring as shown in FIGS. 14 and 14A. The mounting screw can be passed through the axial passage 104 so that the threads of the screw slide or ratchet over the bottom, inner edges of the resilient tabs 124 and 132. As shown in FIG. 12, the threads of the mounting screw engage the bottom edges 140 and 142 of the tabs 124 and 132 to allow the screws to slide past the tabs through the axial passage while engaging the threads so that the screws can be removed only by unscrewing the screws from the clip member. As shown in FIG. 19, the tabs 124 and 132 extend inwardly to engage the screw.

The clip member can be inserted into the opening in the mounting flange of the mud ring as shown in FIGS. 11 and 14. The clip member snaps into the opening so that the upper edge of the second leg 128 engages the bottom surface of the mounting flange of the mud ring to couple the clip member to the mud ring as shown in FIG. 14. As in the previous embodiment, the clip member can be attached to the mounting screws of the wiring device as a preassembled unit and then snapped into the opening in the mud ring.

The clip member 16 of the invention allows preassembly with the mud ring 14 or the wiring device 18. The wiring device can be coupled to the mud ring 14 by sliding the mounting screws through the clip member 16 and then rotating the screws to tighten the wiring device against the mud ring 14. The clip member 16 and the mud ring 14 being provided as a pre-assembled unit enables the electrician to quickly couple the electrical wiring device 18 to the mud ring 14 by pressing the mounting screws through the clip member. The preassembled unit of the wiring device 18 and the clip member 16 can be quickly and easily snapped into the openings in the mounting flange of the mud ring 14. The openings in the mounting flange of the mud ring 14 are aligned with the mounting holes in the electrical box. If needed, the mounting screws of the wiring device can then be threaded easily into the threaded hole in the electrical box to couple the wiring device directly to the electrical box.

Referring to FIG. 20-31, a third embodiment of the invention includes a mounting member in the form of a mud ring 150 and an attachment member 152 for coupling the electrical device 224 to the mud ring 150. The electrical device can be an electrical receptacle or other electrical device as in the previous embodiments. The mud ring 150 is attached to an electrical box in a manner shown in FIG. 1 and the previous embodiments. The electrical box and electrical device are not shown in FIGS. 20-24 for convenience, but are to understood as being used in conjunction with the mud ring 150 and the attachment member 152 for supporting the electrical device 224.

The mud ring 150 serves as a mounting member for mounting the electrical device to the electrical box. The mud ring 150 has a base 154 forming an outwardly extending flange with an outer dimension to mate with the open top end of the electrical box as in the embodiment of FIG. 1. The base 154 includes slots 156 for receiving screws to attach the mud ring 150 to the electrical box as known in the art.

Figure 20:
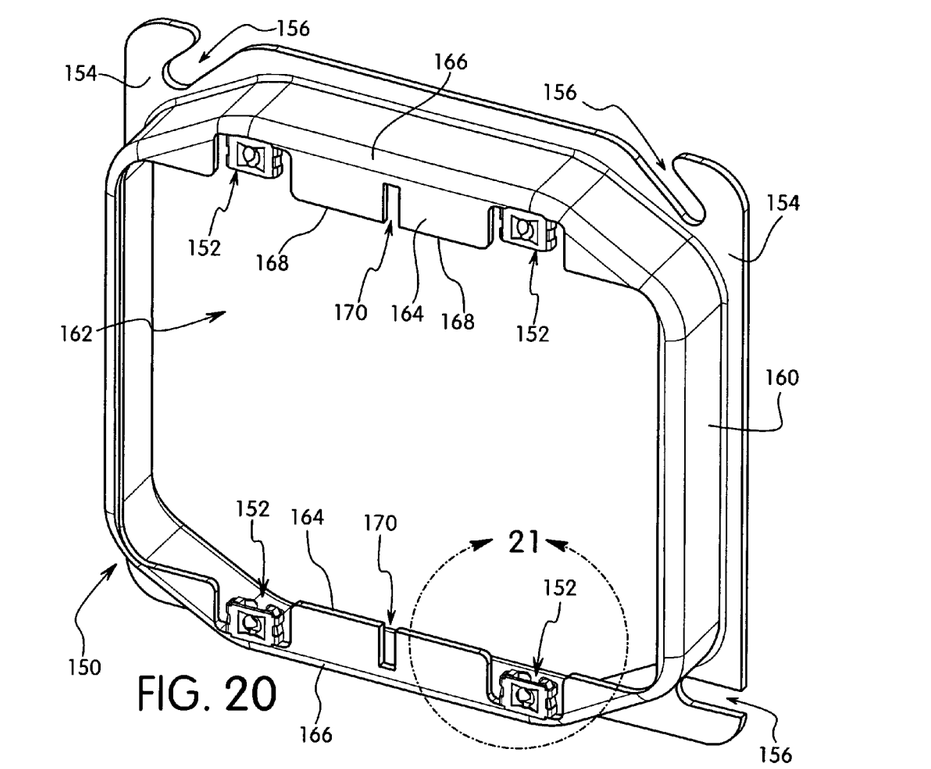
FIG. 20 is a perspective view of another embodiment of the mud ring and attachment member.
Figure 21:
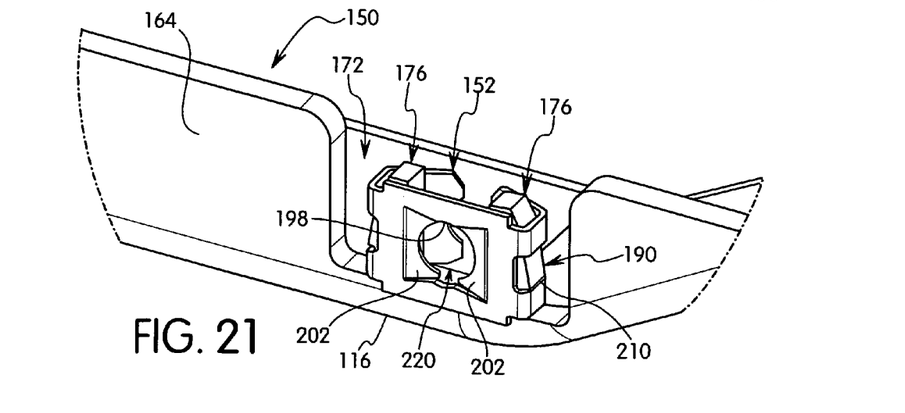
FIG. 21 is an enlarged view of the attachment member coupled to the mud ring of FIG. 20.

The mud ring 150 has a collar 160 that extends perpendicular in an upward direction from the base 154. The collar 160 forms a continuous wall that encircles the central opening 162 of the mud ring. The collar 160 typically has a height corresponding to the thickness of the wall surface for supporting the electrical device flush with the wall surface. A pair of mounting flanges 164 extend inwardly from the top edge 166 of the collar 160 into the central opening 162. The mounting flanges 164 are oriented on opposite sides of the collar and have a dimension for supporting the electrical device.

Figure 22:
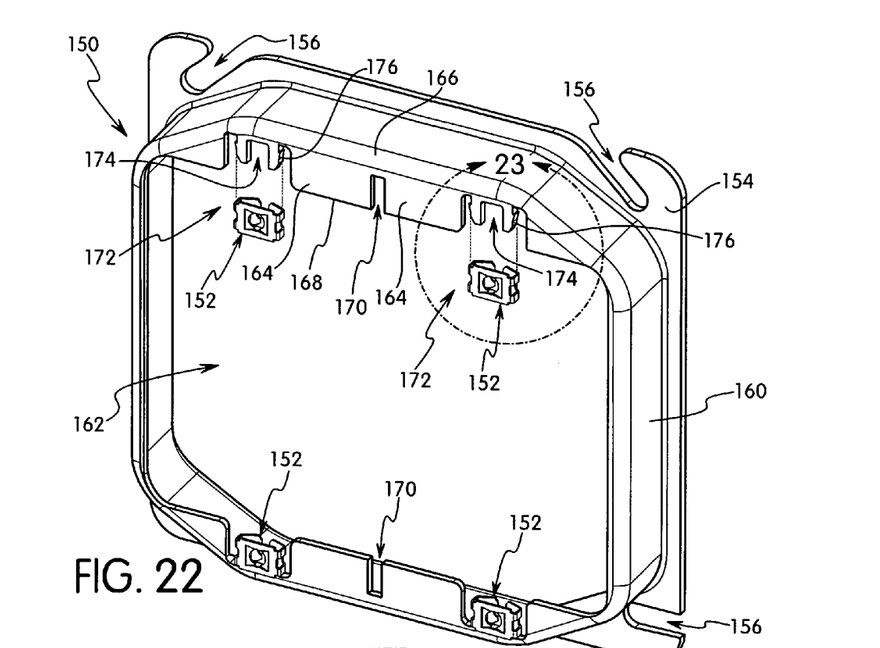
FIG. 22 is an exploded view of the mud ring and attachment member of FIG. 20.

A longitudinal inner edge 168 of the mounting flange 164 forms an inner edge of the central opening of the mud ring. As shown in FIG. 22, the longitudinal edge 168 extends substantially the width of the mud ring. A central notch 170 shown as a slot is provided for receiving a divider plate for dividing the electrical box into two compartments as in the previous embodiment of FIG. 1. A plurality of recesses 172 are formed in the mounting flange 164 for receiving the attachment member 152. In the embodiment shown in FIG. 22, two recesses 172 are provided in each mounting flange 164 and aligned with the recess in the opposite mounting flange for supporting the electrical device.

Figure 30:
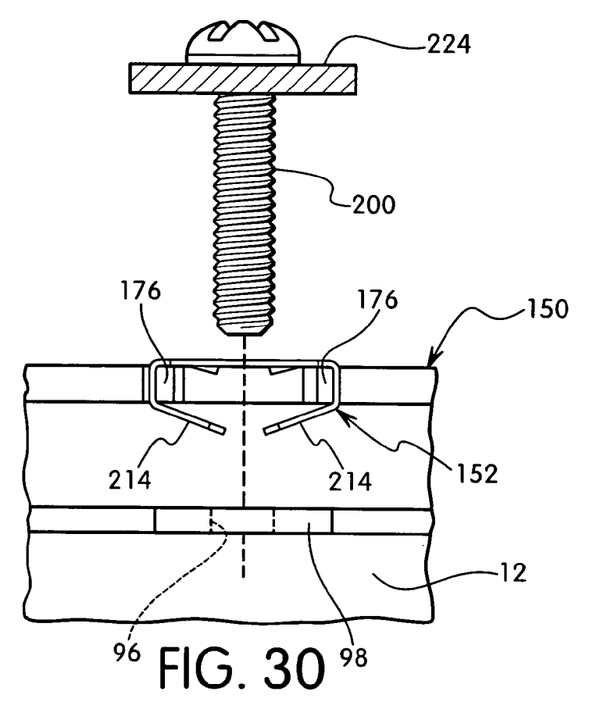
FIG. 30 is an exploded partial cross-sectional view of the mud ring and electrical box assembly.
Figure 31:
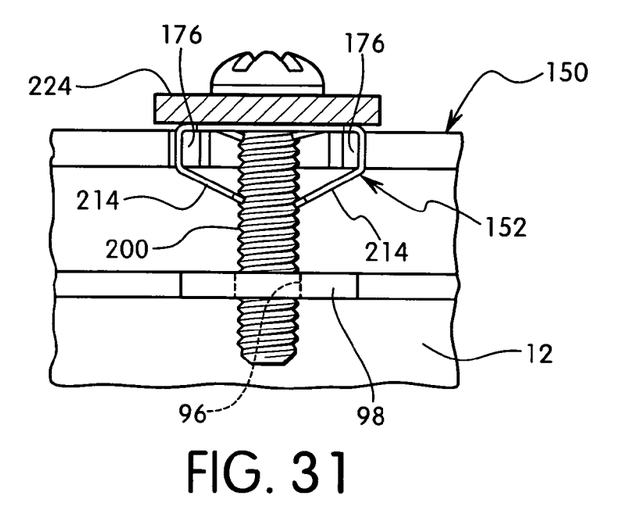
FIG. 31 is a partial cross-sectional view of the electrical device attached to the mud ring and the electrical box.

Each recess 172 includes a central opening 174 that is open to the central opening 162 of the mud ring and forms a slot extending from the inner edge 168 of the mud ring 150. The central opening 174 forms an axial passage for receiving a mounting screw 200 of the electrical device 16 as shown in FIGS. 30 and 31. A pair of projections 176 extend inwardly with respect to the central opening 162 of the mud ring which form a recess or slot 178 between the respective projections 176 and the side edge 180 of the recess 172. The projections 176 have a distal end 182 with an inclined edge 184, an inner side edge 186 and an outer side edge 188. The outer edge 188 includes a coupling member in the form of a detent 190. The coupling member or detent 190 in the embodiment shown has an inclined surface 192 and an end surface 194 forming a barb for coupling the attachment member 152 to the mud ring.

Referring to FIGS. 25-29, the attachment member 152 is a one-piece member preferably formed of a spring steel. The attachment member 152 has a top face 196 with an aperture 198 forming an axial passage 220 for the mounting screw 200. The aperture 198 includes integrally formed tabs 202 extending inwardly from opposite side edges of the aperture. The tabs 202 are formed at an incline extending in a generally downward direction. The tabs 202 have an inner edge 204 with a semi-circular recess 206 for mating with the threads of the screw 200. The tabs 202 are formed by cutting and/or punching the top face 196 and bending the tabs inwardly along the axial passage 200. In the embodiment shown, two opposing tabs 202 are provided, although it will be understood that any number of tabs can be formed to engage the mounting screws of the electrical device.

Figure 25:
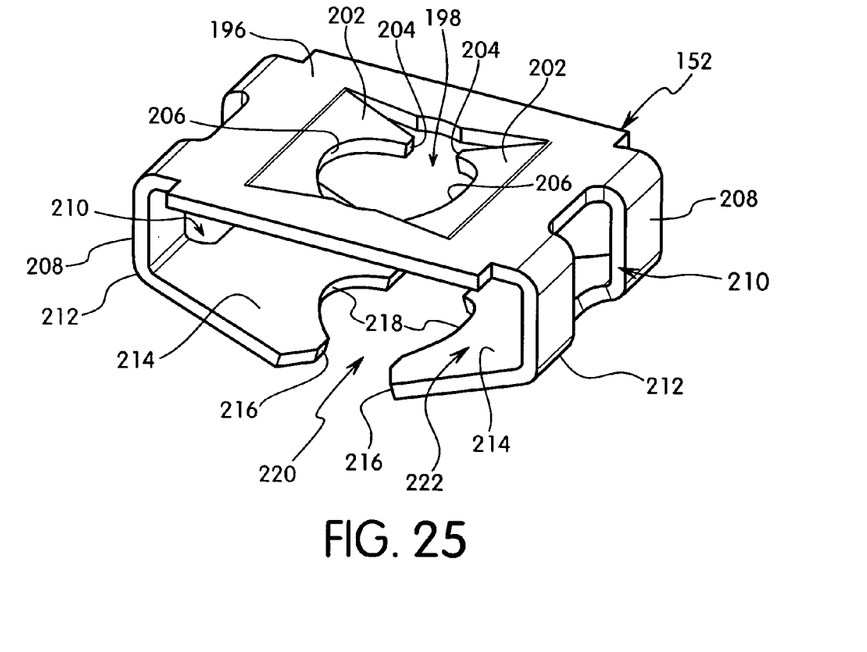
FIG. 25 is a perspective view of the attachment member of FIG. 20.
Figure 26:
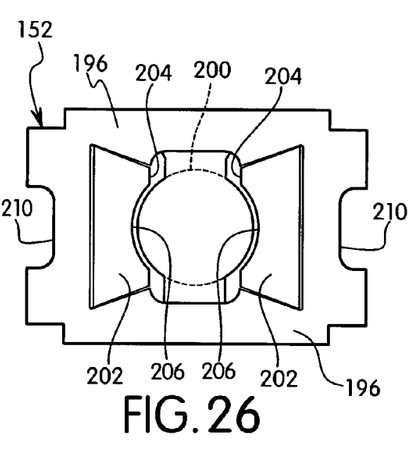
FIG. 26 is a top view of the attachment member of FIG. 25.
Figure 27:
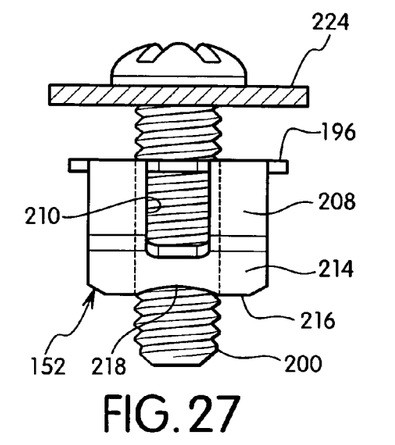
FIG. 27 is a side view of the attachment member of FIG. 25.
Figures 28, 29:
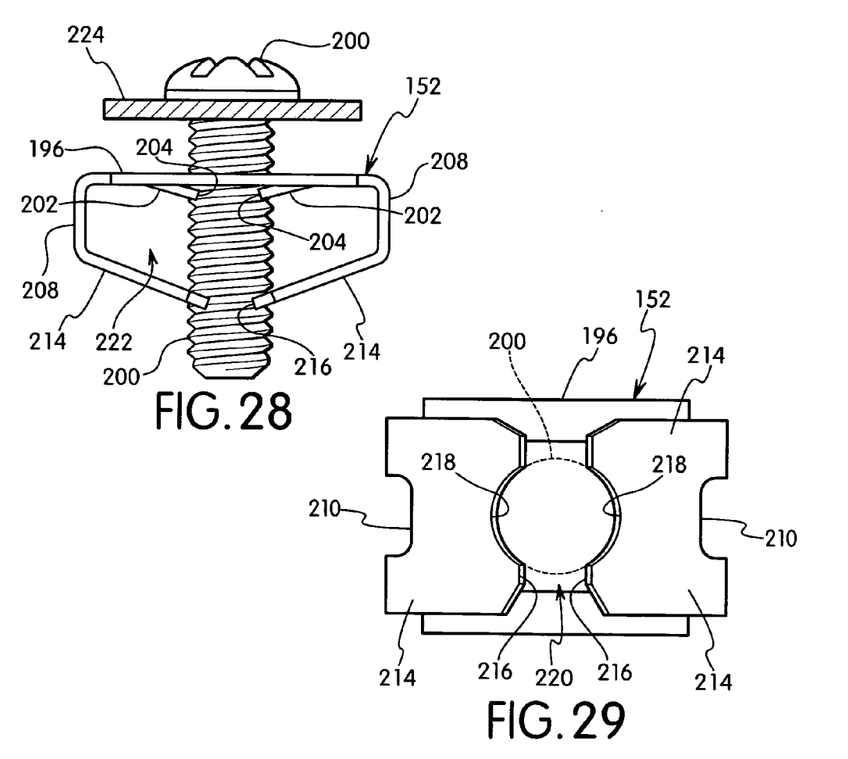
FIG. 28 is an end view of the attachment member of FIG. 25.
FIG. 29 is a bottom view of the attachment member of FIG. 25.

The attachment member 152 includes a pair of legs 208 that extend in a downward direction from the opposite edges of the top face 196 as shown in FIG. 28. In the embodiment shown, the legs 208 extend substantially perpendicular to the plane of the top face 196. As shown in FIG. 25, each leg 208 has an opening 210 with a dimension complementing the detent 190 on the projection 176. The legs 208 have a bottom distal end 212 with an inwardly extending tab 214. The tabs 214 extend at an incline away from the top face 196 and are oriented substantially parallel to the tabs 202. The tabs 214 have a distal end 216 with a semi-circular shaped recess 218 aligned with the recesses 206 in the tabs 202 as shown in FIGS. 25 and 29 for mating with the screw 200.

Figure 23:
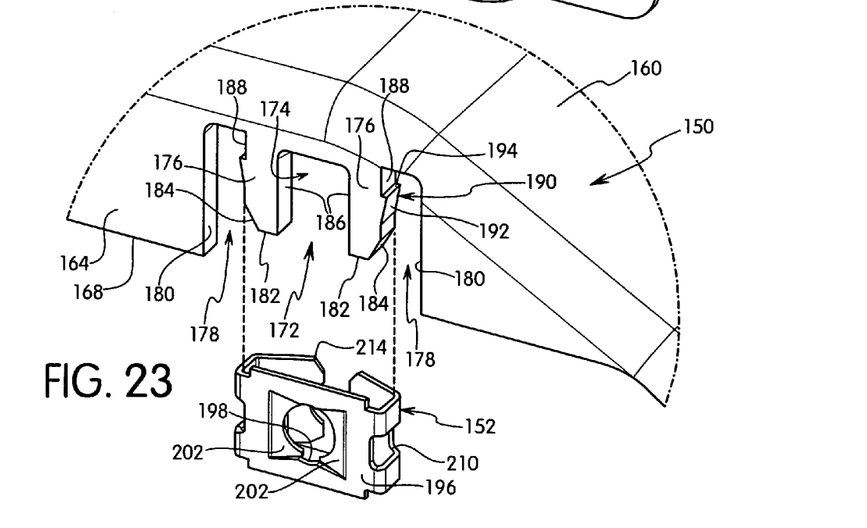
FIG. 23 is an enlarged section view showing the attachment member and mud ring.
Figure 24:
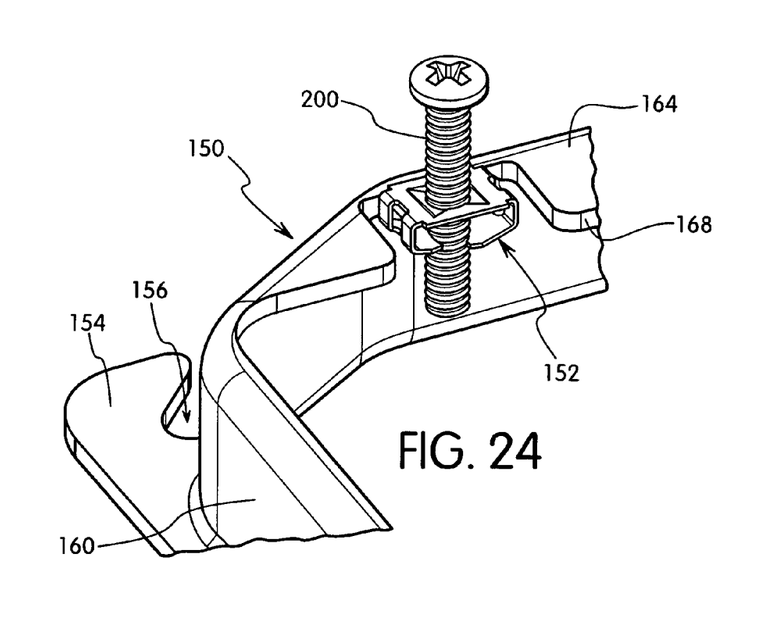
FIG. 24 is a partial perspective view showing the mounting screw attached to the attachment member.

The attachment member 152 is attached to the mud ring 150 by sliding over the projections 176 as shown in FIG. 23. The projections 176 slide through the transverse opening 222 of the attachment member 152 so that the attachment member is supported by the projections. The detents 190 on the outer edge of the projections 176 slide along the inner surface of the legs 208 and snap into the openings 210 in the respective leg to attach the attachment member 152 to the projections 176 and the mud ring. The projections 176 capture and support the attachment members 152 so that the top face 196 is aligned with the flange 168 of the mud ring 150. The central opening 174 forming the recess for the attachment member 152 is open to the inner edge of the mud ring to allow the attachment member 152 to slide onto the projections 176 without the tabs 202 interfering with the projections 176 or the mud ring. The central opening 174 also allows the mounting screw 200 of the electrical device to be attached to the attachment member 152 before coupling the attachment member 152 to the mud ring 150.

During use, the attachment member 152 can be snapped onto the mud ring 150 as shown in FIG. 20. The mounting screw 200 of the electrical device can be pushed through the axial passage 220 of the attachment member 152. The tabs 202 and 214 are angled in a downward direction so that the mounting screw 200 can be pushed through the axial passage so that the threads of the screw slide over the edges of the recess 206 of the tabs 202 and the recess 218 of tabs 214. The screw can then be rotated to tighten the electrical device against the attachment member 152 and mud ring 150. The tabs 202 and 214 of the attachment member are angled away from the top face 196 of the mud ring 150 and the electrical device so that rotating the screws 200 draws the tabs 202 and 214 towards the top face 196 of the mud ring so that the threads of the screw securely grip the attachment member 152 and secure the electrical device to the attachment member 152 and mud ring 150.

The attachment members 152 can also be attached to the screws 200 of the electrical device 224 prior to attaching to the mud ring 150. The attachment members 152 can slide onto the screws 200 or the screws 200 can be threaded into the axial passage 220 of the attachment member 152. The attachment member 152 can then be snapped into the respective recess 172 in the top edge 168 of the flange 164 of mud ring 150 to secure the attachment members 152 and the electrical device to the mud ring. The screws 200 can then be tightened to securely attach the electrical device 224 to the mud ring.

Referring to FIGS. 30 and 31, the attachment member 152 is preferably aligned with mounting holes 96 in the electrical box 12. The mud ring 150 is attached to the electrical box 12 with flanges 154 and openings 156 aligned axially with threaded mounting holes 96. The screws 200 of the electrical device 224 are pressed or threaded through the axial passage 220 of the attachment member 152. In this embodiment, the mounting screws 200 have a length to extend through the attachment member and the threaded holes 96 in the electrical box 12. This arrangement ensures that the electrical device 224 is attached directly and securely to the electrical box 12 by the mounting screws 200.

While various embodiments have been chosen to illustrate the invention, it will be understood by those skilled in the art that various changes and modifications can be made without departing from the spirit and scope of the invention as defined in the appended claims.

What is claimed is:

1. An electrical box assembly comprising:
an electrical box having an open top end;
a mounting member coupled to the open top end of the electrical box, said mounting member having an inner edge defining a central opening for receiving an electrical device and a top face for supporting the electrical device, the top face of the mounting member having a first projection and a second projection extending from said inner edge into said central opening of said mounting member; and
an attachment member slidably coupled to said first and second projections, said attachment member including a first coupling tab extending inwardly with respect to a first outer edge of said top face for coupling said attachment member to said projections of said mounting member and a top face with an axial passage for receiving a mounting screw for the electrical device.

2. The assembly of claim 1, wherein said mounting member comprises
a base for coupling to the electrical box;
a collar extending upwardly from the base and surrounding said central opening; and
an inwardly extending mounting flange defining said top face for supporting the electrical device.

3. The assembly of claim 2, wherein
said projections are spaced apart to define an opening therebetween.

4. The assembly of claim 3, wherein
said projections are integrally formed with said mounting flange and define a first radially extending open slot in said mounting flange and a second radially extending open slot in said mounting flange to receive said attachment member.

5. The assembly of claim 4, wherein said attachment member further comprises
a first leg extending from a first end of said top face;
a second leg extending from a second end of said top face;
said first coupling tab extending inwardly from a bottom end of said first leg for coupling to a bottom side of said first projection; and
a second coupling tab extending inwardly from a bottom end of said second leg for coupling to said second projection.

6. The assembly of claim 5, wherein
said first leg has a first opening; and
said first projection of said mounting member has an outwardly extending detent received in said first opening.

7. The assembly of claim 6, wherein
said second leg of said attachment member has a second opening; and
said second projection of said mounting member has an outwardly extending detent received in said second opening.

8. The electrical box assembly of claim 1, wherein said attachment member comprises
a second coupling tab extending inwardly from a second outer edge of said top face, said first coupling tab and second coupling tab forming a transverse opening for receiving said projections.

9. The electrical box assembly of claim 1, wherein
said top face of said attachment member has an aperture aligned with said axial passage.

10. A mounting assembly for mounting an electrical device to an electrical box, said mounting assembly comprising:
a mounting member having a bottom face adapted for coupling to an open end of an electrical box, said mounting member adapted for supporting the electrical device and having an inner edge defining a central opening for receiving the electrical device, the mounting member having a recess extending from said inner edge and being open to said central opening, a first projection on a first side of said recess defining a first slot and a second projection on a second side of said recess forming a second slot; and
an attachment member coupled to said projections, said attachment member having a first tab at a first end of said attachment member coupled to said first projection, a second tab at a second end of said attachment member coupled to said second projection, an axial passage for receiving a mounting screw of the electrical device, and a transverse opening for receiving said first and second projections of said mounting member.

11. The mounting assembly of claim 10, wherein
said recess has a dimension to enable a mounting screw for the electrical device to slide transversely into said recess.

12. The mounting assembly of claim 11, wherein
said attachment member receiving said mounting screw is adapted for sliding transversely onto said projections.

13. The mounting assembly of claim 10, wherein
said attachment member has a top face with an aperture forming said axial passage;
said first leg extending from a first end of said top surface;
said first tab extending inwardly from said first leg into said axial passage;
said second leg extending from a second end of said top surface; and
said second tab extending inwardly from said second leg into said axial passage.

14. The mounting assembly of claim 13, wherein
said first leg of said attachment member has a first opening; and
said first projection has a detent adapted for coupling with said opening in said first leg.

15. The mounting assembly of claim 14, wherein
said second leg of said attachment member has an opening; and
said second projection has a detent adapted for coupling with said opening in said second leg.

16. The mounting assembly of claim 15, wherein
said detents on said projections have a first end with an inclined surface to allow said attachment member to slide onto said projections, and an end face at a second end to retain said attachment member on said projections.

17. The mounting assembly of claim 13, wherein
said first tab and said second tab extend at an incline with respect to said first leg and second leg, respectively, and have a distal end for engaging the mounting screw within said axial passage.

18. The mounting assembly of claim 17, wherein
said top face has a first coupling tab extending at an incline toward said first tab of said first leg and a second coupling tab extending toward said second tab of said second leg, each of said coupling tabs of said top face extending into said axial passage.

19. A mounting assembly for mounting an electrical device to an electrical box, said assembly comprising:
- a mounting member having a base having a bottom face adapted for coupling to an electrical box, said mounting member having an inner edge defining a central opening for receiving the electrical device, said mounting member adapted for supporting the electrical device, said mounting member having a first opening at a first end and a second opening at a second end extending from said inner edge and aligned for receiving mounting screws of the electrical device; and
- a one-piece attachment member coupled to said inner edge of said mounting member and aligned with each of said openings, each attachment member having a top face with an aperture defining an axial passage for receiving a respective mounting screw, a first leg and a second leg extending from said top face and coupled to said mounting member, at least one first tab engaging the mounting member for coupling the attachment member to the mounting member and said top face having at least one second tab for mating with the mounting screw.

20. The assembly of claim 19, wherein
said top face has a pair of said second tabs extending into said aperture in said top face for coupling with said mounting screw.

21. The assembly of claim 20, wherein
a first of said at least one first tabs extend from a first of said legs into said axial passage; and
a second of said at least one first tabs extends from a second of said legs into said axial passage for coupling the attachment member to the mounting member.

22. The assembly of claim 21, wherein
said first tab of said first leg and said first tab of said second leg extend at an incline away from said top face, and where distal ends of said first and second tabs are spaced apart to form said axial passage.

23. The assembly of claim 22, wherein said inner edge at said first end of said mounting member and said second end of said mounting member, further comprises
a first projection and a second projection extending into said central opening and spaced apart to define said respective openings, and where said respective attachment member is coupled to said first and second projections.

24. The assembly of claim 23, wherein said first projection and second projection further comprise
a detent extending outwardly from an outer surface of said first and second projections for coupling with said attachment member.

25. The assembly of claim 19, wherein said mounting member comprises
a collar extending upward from said base; and
a mounting flange extending from a top end of said collar and having said top face and defining said inner edge.

26. The assembly of claim 25, wherein
said mounting flange has a slot extending from said inner edge and adapted for receiving a removable divider for dividing the electrical box into compartments.

27. The assembly of claim 19, wherein
said first opening and second opening include a first projection for coupling with said first leg and a second projection for coupling with said second leg, and where said first and second projections are spaced apart to define said opening therebetween.

28. The assembly of claim 27, wherein
said first leg of said attachment member has a first opening and said first projection has a detent received in said first opening.

29. The assembly of claim 28, wherein
said second leg of said attachment member has a second opening and said second projection has a detent received in said second opening.

\* \* \* \* \*